United States Patent
Dieffenderfer et al.

(10) Patent No.: US 8,341,383 B2
(45) Date of Patent: Dec. 25, 2012

(54) METHOD AND A SYSTEM FOR ACCELERATING PROCEDURE RETURN SEQUENCES

(75) Inventors: James Norris Dieffenderfer, Apex, NC (US); Michael William Morrow, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 536 days.

(21) Appl. No.: 11/934,264

(22) Filed: Nov. 2, 2007

(65) Prior Publication Data

US 2009/0119486 A1     May 7, 2009

(51) Int. Cl.
  G06F 9/44     (2006.01)
(52) U.S. Cl. ............................................ 712/243
(58) Field of Classification Search .................. None
  See application file for complete search history.

(56) References Cited

U.S. PATENT DOCUMENTS

| | | | | |
|---|---|---|---|---|
| 5,388,263 | A * | 2/1995 | Ellis et al. | 717/124 |
| 5,812,813 | A * | 9/1998 | Henry et al. | 712/218 |
| 6,363,473 | B1 * | 3/2002 | Volentine et al. | 712/202 |
| 6,374,350 | B1 * | 4/2002 | D'Sa et al. | 712/239 |
| 6,848,044 | B2 * | 1/2005 | Eisen et al. | 712/228 |
| 6,898,698 | B1 | 5/2005 | Sunayama et al. | |
| 6,910,206 | B1 * | 6/2005 | Nevill | 717/153 |
| 2007/0006200 | A1 * | 1/2007 | Renno et al. | 717/162 |

FOREIGN PATENT DOCUMENTS

WO     WO0004444 A1     1/2000

OTHER PUBLICATIONS

International Search Repor—PCT/US08/081947, International Search Authority—European Patent Office—Dec. 30, 2008.
Written Opinion—PCT/US08/081947, International Search Authority—European Patent Office—Dec. 30, 2008.
S.B. Furber: "VLSI RISC Architecture and Organization", pp. 231-233 1989, Marcel Dekker, Inc., NY, USA, XP002507906.
Johnson M., "An Alternative to RISC: The Intel 80x86", Microprocessor Report, (1994).

* cited by examiner

*Primary Examiner* — Jacob A Petranek
(74) *Attorney, Agent, or Firm* — Nicholas J. Pauley; Peter Michael Kamarchik; Jonathan T. Velasco (57) ABSTRACT

A method for retrieving a return address from a link stack when returning from a procedure in a pipeline processor is disclosed. The method identifies a retrieve instruction operable to retrieve a return address from a software stack. The method further identifies a branch instruction operable to branch to the return address. The method retrieves the return address from the link stack, in response to both the instruction and the branch instruction being identified and fetches instructions using the return address.

32 Claims, 7 Drawing Sheets

FIG. 1

| | INSTRUCTION: | OPERATION: | MODULE: |
|---|---|---|---|
| | A: | BL PROC1 | MAIN |
| PROC1: | B: | PUSH $R_{14}$ | PROC1 |
| | C: | BL PROC2 | PROC1 |
| PROC2: | D: | PUSH $R_{14}$ | PROC2 |
| | E: | BL PROC3 | PROC2 |
| PROC3: | F: | BX $R_{14}$ | PROC3 |
| | G: | POP $R_{12}$ | PROC2 |
| | H: | MOV PC, $R_{12}$ | PROC2 |
| | I: | POP $R_2$ | PROC1 |
| | J: | BX $R_2$ | PROC1 |
| | K: | ANY | MAIN |

METHOD AND A SYSTEM FOR ACCELERATING PROCEDURE RETURN SEQUENCES

BACKGROUND

1. Field of Invention

The present invention relates generally to computer systems, and more particularly to a method and a system for accelerating return sequences by identifying pop-branch instruction sequences within a processor.

2. Relevant Background

Most programs executed by a processor include subroutines or procedures. Procedures are modules of code that are accessed by a procedure calling sequence. Once the procedure is finished, instruction execution is returned to the caller by the execution of a procedure return sequence.

Within some processor architectures, procedure call and return sequences may be compiled into a sequence of instructions. For example, a procedure calling sequence may consist of a PUSH instruction followed by a branch and link instruction. The PUSH instruction (or instructions) may save parameters used by instructions within the procedure onto the software stack. After the PUSH instruction, the processor may execute a branch and link instruction. The branch and link instruction causes instruction fetching and execution to begin at the starting address of the procedure and saves the address of the next sequential instruction following the branch and link instruction, known as the return or link address, in a link register. The link register may be a special purpose register or one of the general purpose registers (GPRs) used by the processor. Within the procedure, the link register contents are typically pushed onto the software stack so that its value is not overwritten if another procedure is called before returning to the original caller.

After the procedure finishes its function, the processor executes a procedure return sequence to resume instruction execution at the link address (the next sequential instruction address following the procedure calling instruction). Because the return address is often saved on the software stack, the procedure return sequence must first retrieve the return address from the software stack to use that address to determine the next group of instructions to be fetched.

A procedure return sequence may consist of one or more instructions. In some processor architectures a procedure return sequence may be a single instruction such as a POP or load instruction that can read the next return address from software stack and update the program counter (PC). Alternatively, the processor may use a POP or load instruction to read the link address from the software stack into an intermediate register, such as a GPR, before moving that value to the program counter to complete the procedure return sequence. In another illustrative example, the processor may determine that a return from a procedure may be an instruction moving the value saved in a link register (LR) into the PC. When the processor encounters any of these procedure return sequences after a procedure call, the processor jumps back to the next sequential instruction following the procedure calling instruction using the return address value retrieved from the software stack.

Additional logic may be added to the processor's hardware to improve the efficiency of instruction processing. For example, a link stack may be added to a processor's fetch logic to speed up instruction fetching. Those skilled in the art appreciate that a link stack may contain return addresses that may also exist on the software stack. However, the link stack operates independently from the software stack. Hardware logic associated with the link stack identifies procedure calls and returns. As procedure call instructions are identified prior to execution, the associated return address is loaded on to the link stack. Conversely, when procedure returns are identified, the associated return address is retrieved from the link stack and used to resume instruction fetching. Instead of waiting for instructions to execute and retrieving return addresses from the software stack, the processor may fetch instructions speculatively using addresses stored in the link stack.

As processors evolve, the procedure return sequence continues to change. In some processor architectures the procedure return may be comprised of multiple instructions. If the hardware logic supporting the link stack does not recognize these instructions as a procedure return sequence, return addresses may not retrieved from the link stack and as a result, the link stack may become out of sync with the instruction sequence. When the link stack becomes out of sync, the link stack may provide erroneous return address information which may cause multiple address mispredictions.

SUMMARY

Accordingly, there exists a need in the industry to have processor circuitry that recognizes certain instruction sequences, more specifically a POP (or load) and branch instruction sequence, as a procedure return sequence. The present disclosure recognizes this need and discloses a processor having circuitry which identifies instructions corresponding to a procedure return early in the instruction pipeline. After identifying the procedure return, the processor fetches the next group of instructions by using the next return address from the link stack. By recognizing the POP and branch instruction sequence as a program return, the processor may continue fetching instructions based on the correct address retrieved from the link stack.

A method for retrieving a return address from a link stack when returning from a procedure in a pipeline processor is disclosed. The method identifies a retrieve instruction that operates to retrieve a return address from the link stack. The method identifies a branch instruction that operates to branch to the return address. The method retrieves the return address from the link stack in response to both the instruction and the branch instruction being identified. The method fetches a subsequent instruction using the return address.

A pipeline processor is disclosed. The pipeline processor has a line buffer. The line buffer is coupled to an instruction cache. The processor also has fetch logic circuitry which is coupled to the instruction cache. The fetch logic circuitry has a link stack storing predictive return addresses, wherein instructions are loaded from the line buffer into the instruction cache. The fetch logic circuitry retrieves instructions from the instruction cache. The pipeline processor also has pre-decode logic circuitry which communicates with the line buffer, wherein the pre-decode logic circuitry has detection logic circuitry for identifying a procedure return sequence. The procedure return sequence is identified as a retrieve instruction that operates to retrieve a return address from a software stack, and a branch instruction which branches to the retrieved return address. The pipeline processor retrieves the predicted return address from the link stack in response to the identification of the procedure return sequence.

A pipeline processor is disclosed. The pipeline processor has fetch logic circuitry. The fetch logic circuitry has a link stack which stores predicted return addresses. The fetch logic circuitry fetches instructions from an instruction cache. The pipeline processor also has decode logic circuitry, the decode logic circuitry is coupled to the fetch logic circuitry wherein the fetched instructions are decoded by the decode logic circuitry. The decode logic circuitry further has detection logic circuitry, wherein the detection logic circuitry identifies a procedure return sequence. The procedure return sequence is a retrieve instruction retrieving an address from a software stack and a branch instruction that operates to branch to the retrieved address. The pipeline processor retrieves the predicted return address from the link stack in response to the identification of the procedure return sequence. The pipeline processor retrieves the predicted return address from the link stack in response to the identification of the procedure return.

A more complete understanding of the present invention, as well as further features and advantages of the invention, will be apparent from the following detailed description and the accompanying drawings.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

Figure 1:
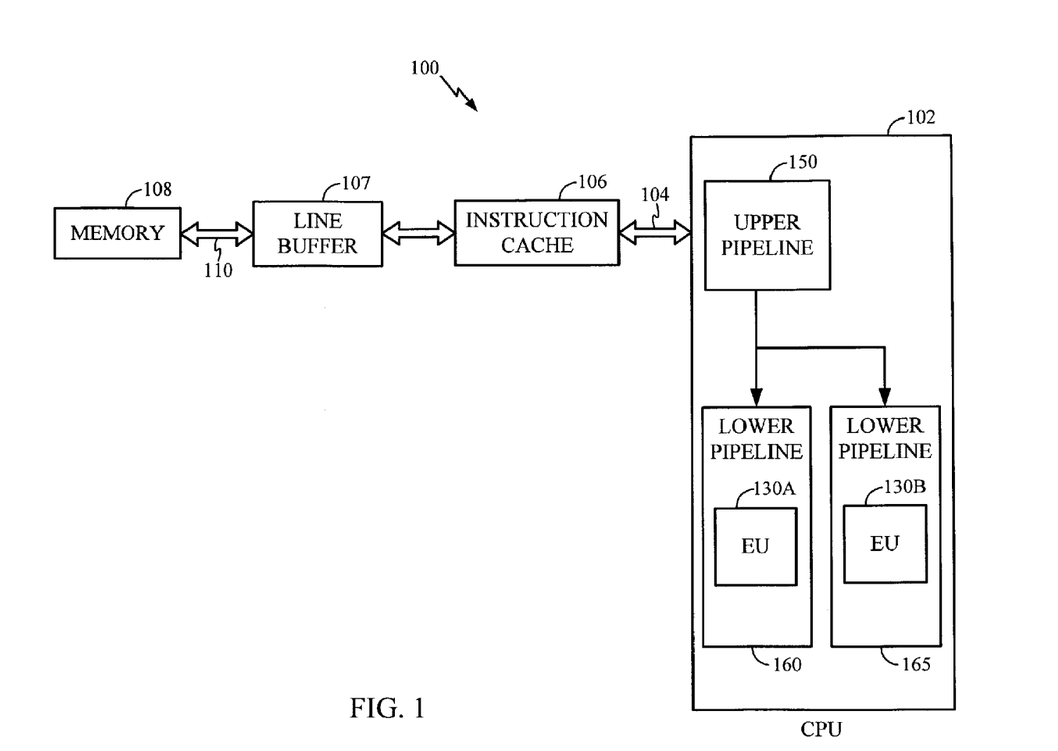
FIG. 1 shows a high level logic hardware block diagram of a processor using an embodiment of the present invention.

FIG. 1 shows a high level view of a superscalar processor 100 utilizing one embodiment of the present invention as hereinafter described. The processor 100 has a central processing unit (CPU) 102 that is coupled via control signals 104 to an instruction cache 106. The instruction cache 106 is also coupled to line buffer 107 and by a general purpose bus 110 to a memory 108. The CPU 102 controls the loading of instructions from memory 108 into the instruction cache 106 via the line buffer 107. The CPU 102 has an upper pipeline 150 coupled to lower pipelines 160 and 165. Within lower pipelines 160 and 165 are execution stages 220 and 225. Within the execution stage 220 are execution units (EU) 130A and within the execution stage 225 are EUs 130B.

As those skilled in the art appreciate, the instruction cache 106 may be a specialized memory designed to bridge the speed gap between the memory 108 and the processor 100. Instructions fetched from memory 108 are placed in the faster instruction cache 106 which is able to be read at processor clock speeds. If an instruction does not exist in the instruction cache 106, the processor 100 retrieves the instruction from the memory 108. As the instruction is retrieved from the memory 108 it is first loaded into the line buffers 107 and is eventually written into the instruction cache 106.

After the instruction cache 106 is loaded with instructions, the CPU 102 accesses them via the control signals 104. Instructions are loaded from the instruction cache 106 into the upper pipeline 150. The instructions are processed in the upper pipeline 150 and are then sent to the lower pipelines 160 or 165 for further processing. As is described in connection with the discussions of FIGS. 3-5, the processor may have logic circuitry designed to detect specific instruction sequences. These specific instruction sequences may correspond to a procedure return. After procedure return instruction sequences have been identified, the processor 100 may perform functions based on those instructions in accordance with multiple embodiments of the present invention.

Some exemplary processing functions performed on the instructions in the upper pipeline 150 may include fetching the instruction, aligning the instruction, decoding the instruction, issuing the instruction to the lower pipelines 160 or 165 and the like. Within the lower pipelines 160 and 165 instructions may be executed by execution units 130A and 130B with the results being recorded.

Figure 2:
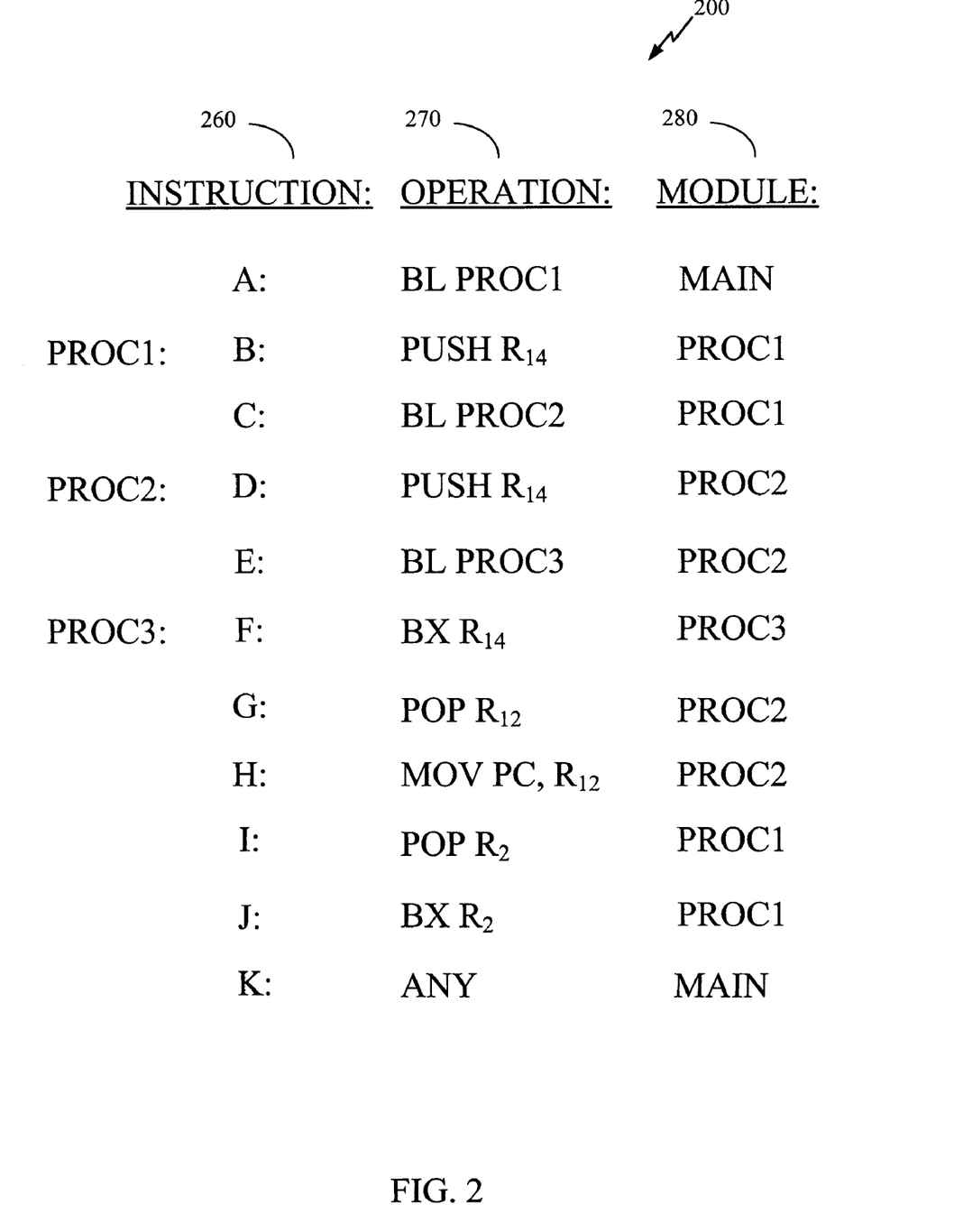
FIG. 2 shows an exemplary group of instructions executed by the processor of FIG. 1.

An illustrative group of instructions 200 having a procedure return using the POP and branch instruction sequence is illustrated in FIG. 2. The instruction 260, the operation of the instruction 270 and the module 280 executing the instruction are displayed. For clarity purposes, any instructions that would push parameters on the software stack for use by the procedures themselves are omitted from this the group of instructions 200. Also omitted are any instructions that would make up the actual function that the procedure performs. The instructions depicted in FIG. 2 are those that call a procedure, save the return address in the link register (GPR $R_{14}$ in this example), store the return address onto the software stack, retrieve the return address from the software stack, and continue processing instructions located at the return address. The group of instructions 200 are displayed in FIG. 2 in program order as they would be in a trace of instruction execution. Those skilled in the art appreciate that the traced instructions are a subset of the actual code that the processor may have fetched and are shown as they are to be executed. The group of instructions 200 consists of three nested procedures.

Within the group of instructions 200 are three procedure calls and their associated returns. The first procedure call is instruction A, which calls procedure PROC1. Instruction B is a preparatory instruction within procedure PROC1, saving the current return address on to the software stack. Instruction C is the second procedure call instruction, calling procedure PROC2. Instruction D is another preparatory instruction within procedure PROC2, saving the return address associated with PROC2 on to the software stack. The last procedure call instruction is instruction E, which calls procedure PROC3.

Corresponding to the procedure call instructions are the procedure return instructions. The first procedure return instruction is instruction F. In previous processor architectures, instruction F is recognized as a procedure return instruction. The next two instructions, instructions G and H combined represent another procedure return. Commonly, in previous processor architectures, the instruction combination of a POP and branch instruction may not be properly identified as a procedure return for use by the hardware link stack. As a result in these previous processors, the next return address on the link stack may not be retrieved when instructions G and H are identified. A processor using one embodiment may alleviate this possible link stack corruption. In one embodiment, after instruction H is identified as a procedure return instruction, the processor 100 may retrieve the next address from the link stack and use the retrieved address to continue fetching instructions. In this example, the next address on the link stack points back to procedure PROC1, and more specifically, it points to the next sequential instruction following instruction C (instruction I). Instruction H may also be referred to as an implicit branch instruction.

The next two instructions, instructions I and J are also interpreted as a procedure return sequence. When instruction J is identified by the processor 100 as a procedure return instruction, the next address on the link stack is retrieved and used to continue instruction fetching. Instruction J is an explicit branch instruction. In this example, the next address off the link stack points returns the program execution back to the main program. In previous processor architectures, the combination of instructions I and J may not have been properly identified as a procedure return sequence for use by the hardware link stack. As is described in greater detail in the discussion of FIGS. 3-7, various embodiments of the present invention identify the combination of a POP and branch instruction as a procedure return sequence.

Figure 3:
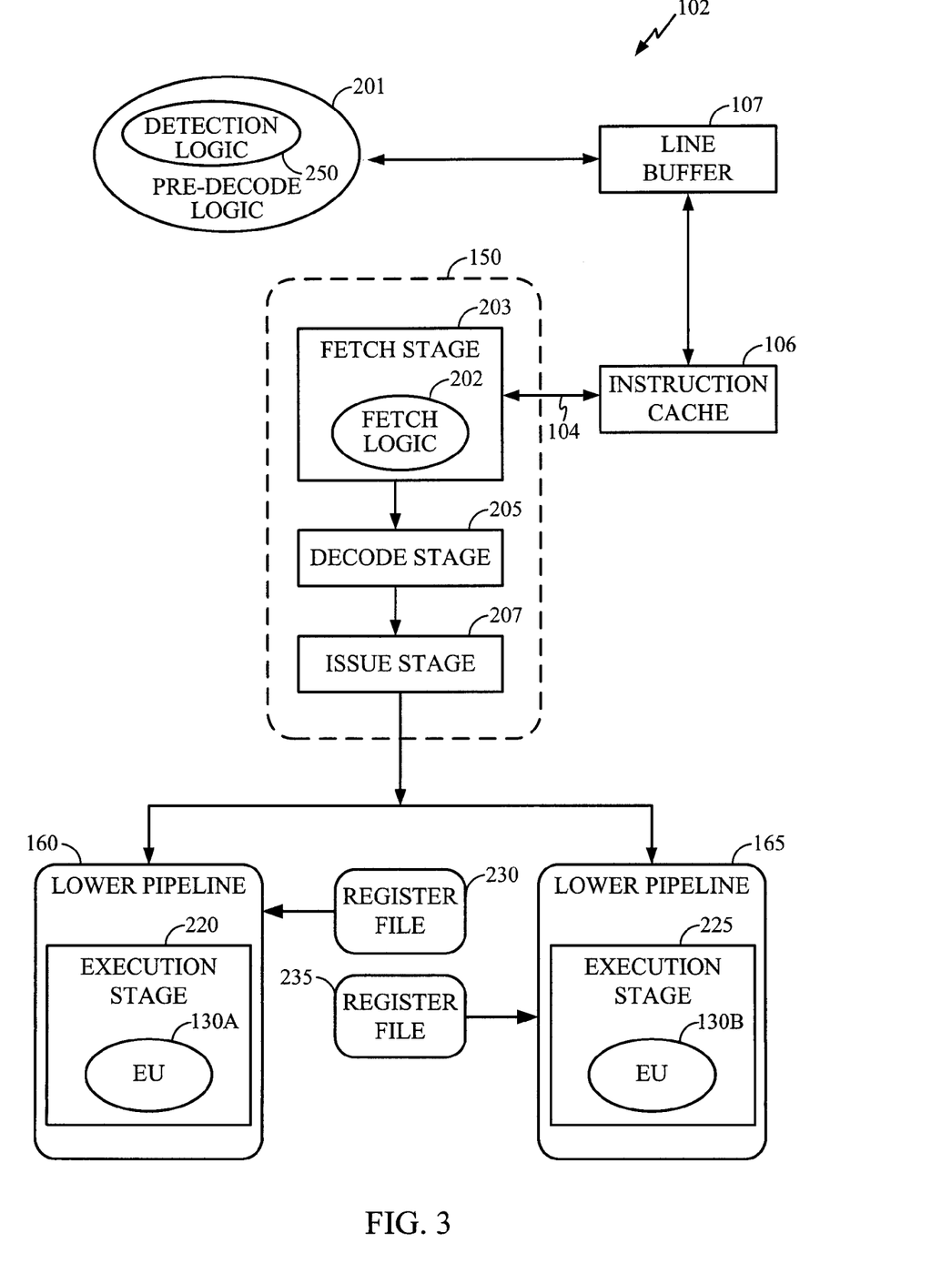
FIG. 3 displays a more detailed block diagram of the upper and lower pipelines of the CPU of FIG. 1 incorporating a detection logic circuit in accordance with one embodiment of the present invention.

FIG. 3 displays a more detailed block diagram of the CPU 102 utilizing an embodiment of the present invention. Within the CPU 102 the upper pipeline 150 has a fetch stage 203 containing fetch logic circuitry 202 which is coupled to the instruction cache 106 by control signals 104. Also in the CPU 102 is a pre-decode logic circuitry 201 having detection logic circuitry 250. The pre-decode logic circuitry 201 is coupled to the line buffer 107 which is coupled to the instruction cache 106. The fetch stage 203 is coupled to a decode stage 205 which in turn is coupled to an issue stage 207. Coupled to the decode stage 205 is decode logic circuitry (not shown for ease of illustration) which decodes specific information about the instruction. Within the issue stage 207 may be several instruction queues (not shown for ease of illustration) which hold the instructions prior to the instructions issuing to the lower pipelines 160 and 165.

As those skilled in the art may appreciate, a pipeline stage may have a register or group of registers designed to hold an instruction. When an instruction enters a particular stage, the processor 100 loads the instruction into the register or group of registers linked to that stage. When an instruction is held in the register or group of registers within each stage, logic circuits may perform certain operations, depending on the instruction. After the logic circuits have performed the intended operation, the instruction is then passed on to the next sequential stage. In addition, while instructions are in the upper pipeline 150, they are "processed" by the various logic circuits. Processing the instructions may include fetching the instructions, decoding the instructions, aligning the instructions, issuing the instructions and the like.

Instructions enter the upper pipeline 150 and move from the fetch stage 203 through the issue stage 207. Instructions are fetched during the fetch stage 203 by the fetch logic circuitry 202. After the instructions are fetched, they are decoded during the decode stage 205 by the decode logic circuitry. After the decode stage 205, the instructions are processed in the issue stage 207. After the instructions leave the issue stage 207 the instructions are executed in either the lower pipeline 160 or the lower pipeline 165. As discussed previously, within the lower pipeline 160 is the execution stage 220 and the EUs 130A. Within the lower pipeline 165 is the execution stage 225, and EUs 130B. The lower pipelines 160 and 165 access the register files 230 or 235 respectively.

The pre-decode logic circuitry 201 may be used by the processor 100 to partially decode and identify information about an instruction prior to the instruction being saved in the instruction cache 106. The pre-decoded information may be saved along with the instruction when the instruction is stored in the instruction cache 106. Within the pre-decode logic circuitry 201, the detection logic circuitry 250 may identify interdependencies between instructions. For example, the detection logic circuitry 250 may be designed to identify when a POP instruction and a branch instruction utilize the same register. As is explained in the discussions of FIG. 4, after the detection logic circuitry 250 identifies an instruction sequence consisting of a POP and branch instruction as a return from a procedure call, the fetch logic circuitry 202 interprets this information when the branch instruction is fetched from the instruction cache 106.

Associating pre-decoded information with an instruction may be accomplished by setting a bit in a particular location within the information field associated with the instruction, when the instruction is loaded into the instruction cache 106. Saving the pre-decoded information in the instruction cache 106 may also be referred to as flagging the instruction. For example, after determining an instruction is a procedure return instruction, a bit may be set in one location in the instruction header identifying that the instruction is a procedure return instruction. Alternatively, the processor 100 may encode the pre-decoded information into the instruction header for the identified instruction or instructions. In this manner, the processor 100 may use multiple bits to encode different information for different instructions based on selected or predetermined criteria. The pre-decoded information may be retrieved as the instruction is being fetched from the instruction cache 106. The processor 100 may then perform certain functions based on the identified information.

Figure 4:
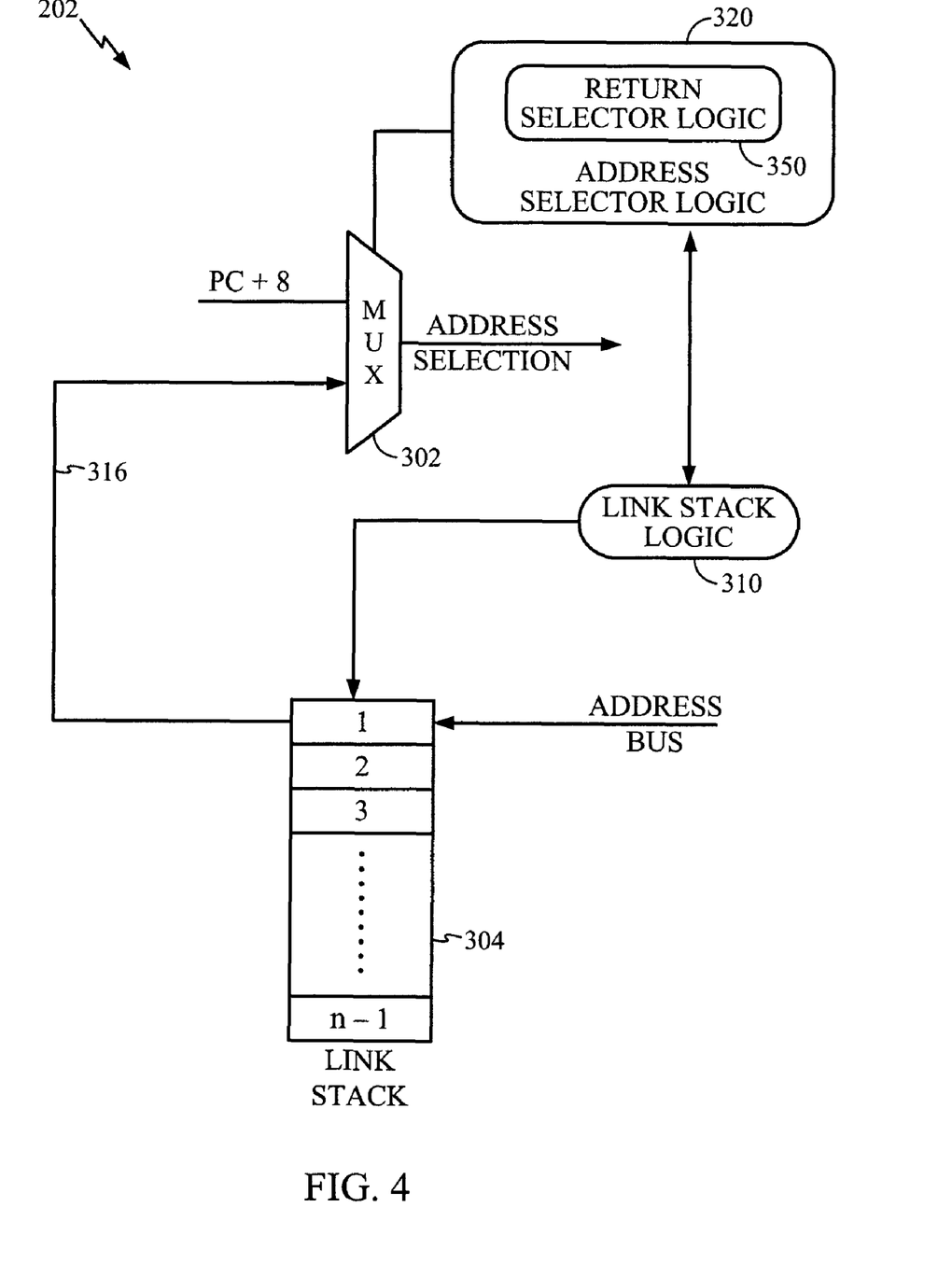
FIG. 4 shows a more detailed view of fetch logic circuitry of FIG. 3.

FIG. 4 displays fetch logic circuitry 202 according to one embodiment of the present invention. The fetch logic circuitry 202 includes an address selector logic circuitry 320 which controls an address selection mux 302. The address selector logic circuitry 320 includes return selector logic circuitry 350. Coupled to the input of address selection mux 302 is a link stack output 316 which comes from a link stack 304. Link stack logic circuitry 310 communicates with the address selector logic circuitry 320 and controls both the input and the output of the link stack 304. The link stack 304 receives return addresses from an address bus when procedure calls are identified.

Within the link stack 304, predictive return addresses may be saved. The link stack 304 may be a last in first out (LIFO) portion of memory storing instruction addresses which correspond to return addresses associated with procedure returns. The link stack 304 operates independently from the software stack. When an instruction is identified as the procedure return instruction early in the instruction pipeline, the processor 100 may proactively fetch instructions using return addresses stored on the link stack instead of waiting for the procedure return to execute in the lower pipe line 160 or 165.

As displayed in FIG. 4, the address selection mux 302 may receive the next sequential program addresses. The next sequential program address may be the current program counter incremented by 8 address locations (PC+8). In this embodiment, instructions are fetched from the instruction cache 106 two instructions at a time where each instruction is four bytes long. In other processor embodiments, the next sequential program address may be the program counter incremented by different amounts. As mentioned previously, the address selection mux 302 may also receive predictive address information from the link stack 304. When the processor 100 determines that a procedure return has occurred, the next address in the link stack 304 is retrieved and used as a starting location to fetch the next group of instructions.

The address selection mux 302 may receive address information from other sources. For example, the branch target address cache (BTAC) may provide addresses used to fetch instructions. Alternatively, an interrupt address may be used to fetch instructions. For ease of illustration these other sources of addresses are not shown.

The address selector logic circuitry 320 determines which of its inputs will be passed through the address selection mux 302 and used to fetch the next group of instructions. If the address selector logic circuitry 320 determines that the next group of addresses to be fetched are the next sequential addresses (PC+8), the PC+8 input is selected. Alternatively, if the return selector logic circuitry 350 within the address selector logic circuitry 320 determines that the link stack 304 contains the next fetch address, the link stack output 316 is selected.

In order to utilize the link stack 304, the processor 100 needs to determine when a procedure call and corresponding return are identified during the instruction processing sequence within the upper pipeline 150. Since the link stack 304 is used to predictively fetch instructions, the processor 100 does not wait for instructions to execute before fetching subsequent instructions. Instead, after the processor 100 has identified as a procedure call instruction in the upper pipeline 150, the processor 100 loads the return address associated with the procedure call onto the link stack 304 via the address bus. Then the processor 100 fetches the instructions of the procedure.

At the end of the procedure, the processor 100 encounters a procedure return sequence. As a result of the procedure return sequence, the processor will "pop" the link stack 304 to retrieve the corresponding return address and branch to that return address to resume instruction fetching. The processor 100 identifies a procedure return instruction and retrieves the next return address off the link stack. A procedure return instruction may be a POP instruction or a load instruction that reads the software stack and writes the PC. If the return selector logic circuitry 350 identifies that a particular POP instruction is a procedure return then, the return selector logic circuitry 350 then causes the address selector logic circuitry 320 to cause the link stack output 316 to be directed through the address selection mux 302. The return address taken from the link stack 304 is then used to fetch the next set of instructions.

As described previously, procedure return sequences may consist of one or more instructions. For example, in some ARM implementations, a branch instruction to the value stored in the link register ($R_{14}$) may be interpreted as a procedure return. Alternatively, a move instruction moving the value of the link register ($R_{14}$) into the program counter ($R_{15}$) may also be interpreted as a procedure return. It is important that the processor 100 accurately identify procedure returns. If the processor 100 does not accurately identify procedure returns, the link stack 304 will become out of sync with respect to the procedure return instructions. If the link stack 304 becomes out of sync, the processor 100 may have to go into a branch correction sequence and execution performance may be impacted.

As processor instructions sets have evolved, alternative instruction sequences may be identified as procedure return sequences. In one exemplary embodiment, a POP or load instruction (that does not update the PC) popping a return address to a particular register followed by a branch instruction to the value stored in the particular register may be interpreted as a procedure return sequence. The branch instruction may or may not be the next sequential instruction following the POP instruction.

In order to facilitate the identification of a procedure return sequence consisting of a POP and branch instruction, information relating to both instructions is gathered. The POP instruction of a procedure return may involve one or more registers. When a POP instruction is identified, the POP instruction's register list may be saved and compared with the register targets of any subsequent instruction. The saving and comparing of the register list may also be referred to as maintaining that the POP instruction has been identified. If a non-branching instruction utilizes a register identified in the register list associated with the POP instruction before a branch to that register is encountered, that register is discounted from the saved register list. If a branch instruction that does not use a register in the saved register list is encountered before a branch instruction that does use a register in the saved register list, the search for a POP-branch return sequence for the previous POP is terminated. When a branch instruction using a register in the register list is encountered, the processor 100 may then determine that a procedure return is being processed. As a result, the address at the top of the link stack 304 may then be retrieved and used to fetch the next group of instructions.

As described previously, the pre-decode logic circuitry 201 (FIG. 3) may have identified a POP and branch instruction sequence that utilize the same register and as a result the branch instruction is identified as a procedure return instruction. The processor 100 may have saved this information into the instruction header when the branch instruction was stored into the instruction cache 106. When the fetch logic circuitry 202 retrieves the saved pre-decoded information with the branch instruction, the processor 100 uses the return selector logic circuitry 350 to identify that the branch instruction is a procedure return. After the return selector logic circuitry 350 has determined that the branch instruction is a procedure return, the return selector logic circuitry 350 causes the address selection logic circuitry 320 to direct the link stack output 316 through the address selection mux 302. The return selector logic circuitry 350 also communicates with the link stack logic circuitry 310 causing the next value in the link stack to be returned. As a result, the link stack address is used to fetch the next set of instructions.

Figure 5:
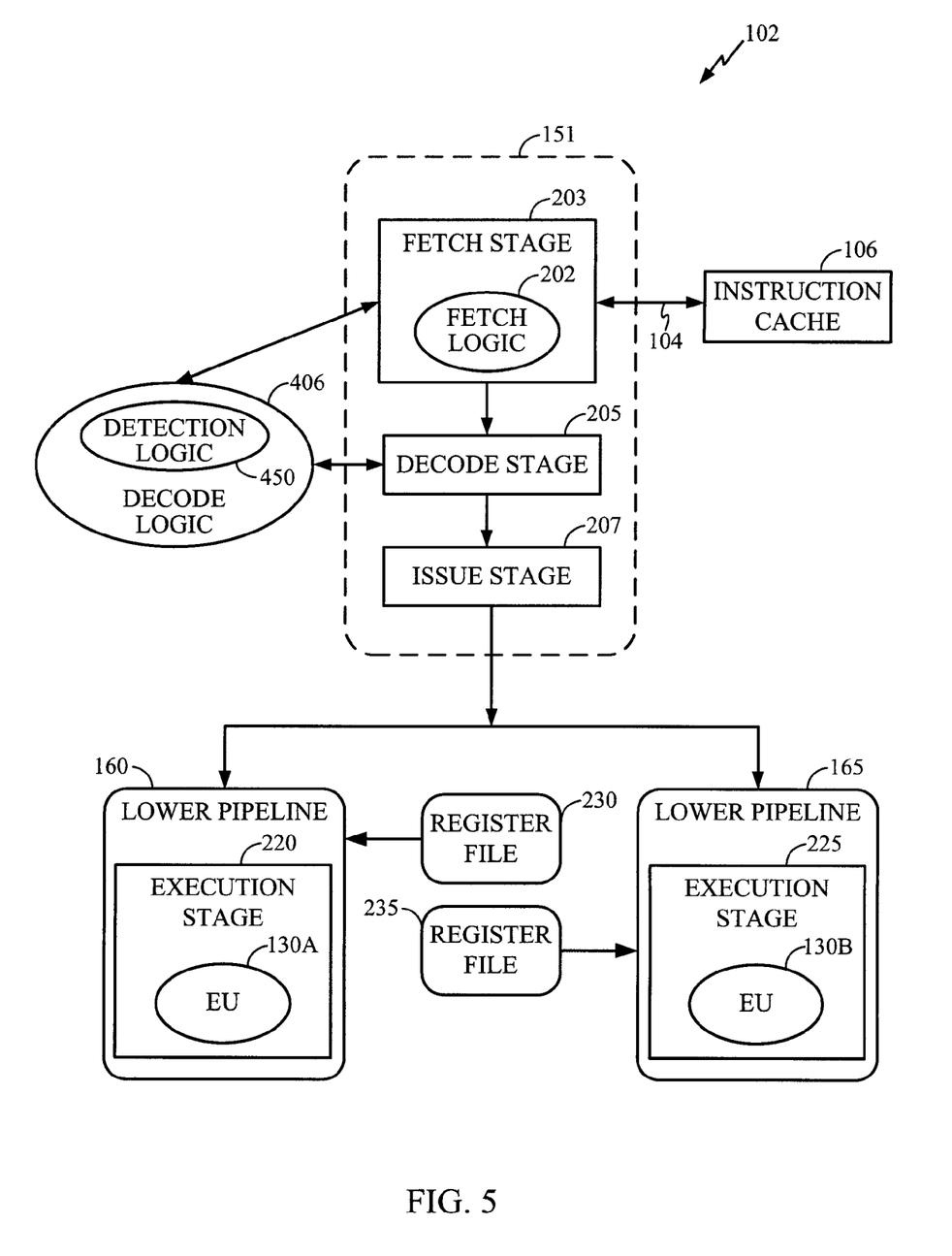
FIG. 5 shows an alternative embodiment of the upper and lower pipelines utilizing the detection logic circuitry.

FIG. 5 displays a CPU 102 with an upper pipeline 151 in accordance with an alternative embodiment having decode logic circuitry capable of detecting a procedure return consisting of the POP/branch instruction sequence. More specifically, the CPU 102 contains decode logic circuitry 406 having detection logic circuitry 450. As instructions are decoded by the decode logic circuitry 406, information relating to the instructions are identified. The detection logic circuitry 450 may monitor the decoded instruction to determine when a procedure return is identified. As previously discussed, a procedure return sequence may consist of one or more instructions. The detection logic circuitry 450 may determine that a procedure return sequence occurs when a POP instruction and subsequent branch instruction are decoded.

When the detection logic circuitry 450 determines that a procedure return has been identified, the detection logic circuitry 450 communicates this information to the return selector logic circuitry 350, which in turn communicates this information to the link stack logic circuitry 310 (FIG. 4). The return selector logic circuitry 350 then causes the address selector logic circuitry 320 to direct the link stack output 316 through the address selection mux 302. The return address taken from the link stack 304 is then used to fetch the next set of instructions.

The inventive concepts associated with the embodiments may be further explained by referring back to group of instructions 200 in FIG. 2. Instruction A is the call of procedure PROC1. When instruction A branches to PROC1, the processor 100 stores the next sequential address into the link register ($R_{14}$). The next sequential address is the return address associated with returning back to the Main program. When instruction A is identified as a procedure call, the link stack logic circuitry 310 causes the return address associated with instruction A to be loaded on to the link stack 304. As displayed in FIG. 2 instruction A is part of the main program. Instruction A branches to PROC1 and the next processed instruction is instruction B.

Instruction B is the first instruction within PROC1 and is a preparatory instruction for the call of procedure PROC2. Instruction B saves the current return address by pushing the value of $R_{14}$ on to the software stack. Next, instruction C is processed. Instruction C is a call of procedure PROC2. When instruction C is identified as a procedure call the link stack logic circuitry 310 saves the return address associated with instruction C on to the link stack 304. Instruction C branches to the procedure PROC2 and the next instruction processed is instruction D.

Instruction D is the first instruction within procedure PROC2 and saves the current return address by pushing the value of $R_{14}$ on to the software stack. Instruction D is another preparatory instruction, getting ready for the next procedure call instruction (instruction E). When instruction E is identified as a procedure call, the link stack logic circuitry 310 causes the return address associated with instruction E to be loaded on to the link stack 304. Instruction E is the second instruction within procedure PROC2 and calls procedure PROC3. Instruction E branches to the address associated with instruction F, the first instruction within the procedure PROC3. Instruction F is the only instruction within procedure PROC3 and is a return. Specifically, instruction F branches to the value currently in the link register ($R_{14}$). Commonly, in existing processor architectures, instruction F is recognized as an instruction return. When instruction F is processed, the detection logic circuitry 450 determines that instruction F is a procedure return and causes the next return address on the link stack 304 to be retrieved. The processor uses the return address to return to procedure PROC2.

Within procedure PROC2, the next instruction to be processed is instruction G which "pops" the current value off of the software stack and saves it into register $R_{12}$. For ease of illustration, instruction G "pops" a single register. However, in an alternative embodiment, the POP instruction may return multiple values for multiple registers. In this alternative embodiment, the processor 100 may keep a list of the "popped" registers in order to compare the register list with a subsequent branch instruction using one of those registers in the register list as a branch target address. In one embodiment, the detection logic circuitry 450 may store the list of "popped" registers.

Instruction H branches to the retrieved address that is now in $R_{12}$. Even though instruction H is not an explicit branch instruction (BX), it is an equivalent branch instruction. As those skilled in the art appreciate a MOV, PC, $R_N$ may also be interpreted as an implicit branch instruction. As explained in the instruction flow charts 600 and 700 of FIGS. 6 and 7, the detection logic circuitry 250, 450 determines that the POP instruction (instruction G) along with the branch instruction to the "popped" register ($R_{12}$ of instruction H) constitutes a procedure return sequence. As a result, the processor 100 uses the link stack 304 to provide the next fetch address and the instruction fetching returns to procedure PROC1.

After processing instruction H, the instruction fetching returns back to procedure PROC 1 and identifies instruction I. Instruction I pops the next value off the software stack into R.sub.2. Still within procedure PROC1, Instruction J branches to the address stored in R.sub.2. Similar to instruction H, instruction J branches to an address stored in a previously "popped" register. As a result, the detection logic circuitry 250, 450 determines that instruction J is a procedure return instruction and the next value from the link stack 304 is used to fetch the next group of instructions. In this example, after instruction J is processed, instruction K is fetched. Instruction K may be any instruction within the main program as displayed in FIG. 2.

In one embodiment, the processor 100 uses the detection logic circuitry 250 to identify that instruction F and sequence of instructions G and H, and I and J are to be interpreted as procedure returns. As a result, when the set of instructions 200 are encountered in the line buffer 107 by the detection logic circuitry 250, instruction F, H, and J are pre-decoded as being a procedure return instructions with the pre-decoded information being saved in the instruction cache 106. Thus when instructions F, H, and J are fetched from the instruction cache 106 by the fetch logic circuitry 202, the return selection logic circuitry 350 causes return addresses to be retrieved from the link stack 304 which is used to fetch the next group of instructions.

In an alternative embodiment, the detection logic circuitry 450 may also be designed to identify that instruction F and the sequence of instructions G and H, and I and J are to be interpreted as a procedure returns. In this case, when the group of instructions 200 are decoded in the decode stage 205, the detection logic circuitry 450 identifies that instructions F, H, and J are procedure return instructions and communicates this to the return selector logic circuitry 350. The return selector logic circuitry 350 then causes the next return address within the link stack 304 to be used to determine the next fetch address.

Figure 6:
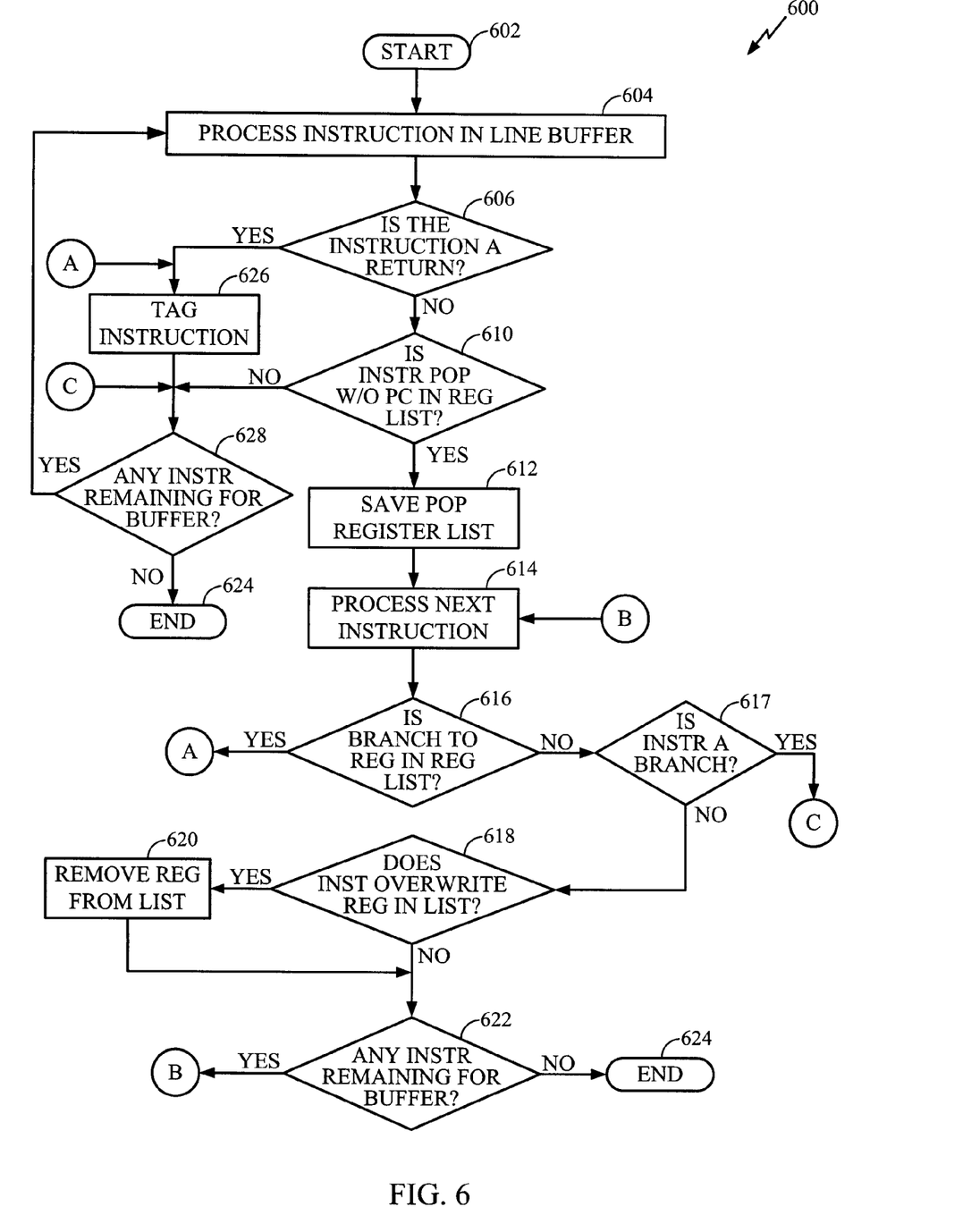
FIG. 6 shows a flow chart illustrating an instruction process flow performed by the processor of FIG. 1 recognizing a program return and using a link stack to fetch instructions.

FIG. 6 displays an instruction flow 600 illustrating the steps performed by the processor 100 having the detection logic circuitry 250 within the CPU 102 of FIG. 3. For ease of illustration, the flow chart 600 assumes that the line buffer 107 within the CPU 102 is only a single instruction wide and the instructions are returned in sequence from the start of the cache line address. Those skilled in the art appreciate that some processors may have line buffers capable of processing multiple instructions out of sequential order. The inventive concepts as described herein may be applied to either type of processor.

The instruction flow 600 begins at start block 602. From block 602, the instruction flow proceeds to block 604 where the first instruction in the line buffer 107 is processed by the detection logic circuitry 250. The instruction flow 600 then proceeds to decision block 606. In decision block 606, the detection logic circuitry 250 determines if the instruction is a known procedure return. As discussed previously, a known procedure return may be any of the previously identified procedure returns with the exception of a POP/branch sequence. If at decision block 606 the detection logic circuitry 250 determines that the instruction is a previously known procedure return, the instruction flow 600 proceeds to block 626 where the instruction is identified or flagged as a procedure return. If at decision block 606 the detection logic circuitry 250 determines that the instruction is not a previously known procedure return, the instruction flow proceeds to decision block 610.

At decision block 610, the detection logic circuitry 250 determines if the instruction is a POP instruction that does not have the program counter (PC) in the popped register list. If the instruction is not a POP instruction without the PC in the register list, the instruction flow 600 proceeds to decision block 628. Otherwise if the instruction is a POP instruction that does not contain the PC in the register list, the instruction flow 600 proceeds to block 612. At block 612, the detection logic circuitry 250 saves the register list of the POP instruction for use in analyzing any subsequent instructions in the line buffer 107.

From block 612 the instruction flow proceeds to block 614. At block 614, the detection logic circuitry 250 retrieves the next instruction from the line buffer 107. The process flow continues from block 614 to decision block 616. At decision block 616, the detection logic circuitry 250 determines if the next instruction in the line buffer 107 is a branch instruction to any of the registers saved in the register list. If the instruction is a branch to a register in the register list, the instruction flow proceeds to block 626 where the instruction is flagged as a procedure return instruction. If at decision block 616 the detection logic circuitry 250 determines that the instruction is not a branch instruction to a register in the saved register list, the instruction flow 600 continues to decision block 617.

At decision block 617, the detection logic circuitry 250 determines if the instruction is a branch instruction. If the instruction is a branch instruction, the instruction flow proceeds to decision block 628. If at decision block 617 the detection logic circuitry 250 determines that the instruction is not a branch instruction, the instruction flow proceeds to decision block 618. At decision block 618, the detection logic circuitry 250 determines if the instruction overwrites any of the registers in the saved register list. If the instruction overwrites any of the registers in the saved register list, the instruction flow 600 continues to block 620 where the overwritten register is removed from the saved register list. From block 620, the instruction flow 600 continues to decision block 622.

If at decision block 618, the detection logic circuitry 250 determines that the instruction did not overwrite any registers in the saved register list, the instruction flow 600 proceeds to decision block 622. At decision block 622 the detection logic circuitry 250 determines if there are any instructions remaining for the line buffer 107. If there are no instructions remaining for the line buffer, the instruction flow 600 ends at block 624. If there are instructions remaining in the line buffer 107, the instruction flow 600 proceeds back to block 614 where the next instruction in the line buffer 107 is processed.

At block 626, the detection logic circuitry tags the instruction as a return instruction. As mentioned previously, tagging the return instruction allows the fetch logic circuitry 202 to identify the return instruction when it is fetched from the instruction cache 106. From block 626, the instruction flow 600 proceeds to decision block 628. At decision block 628, the detection logic circuitry 250 determines if there are any instructions remaining to be processed in the line buffer 107. If there are no instructions remaining to be processed in the line buffer 107, the instruction flow 600 ends at block 624. If there are additional instructions remaining to be processed, the instruction flow 600 proceeds to block 604 where the next instruction is processed by the detection logic circuitry 250.

Figure 7:
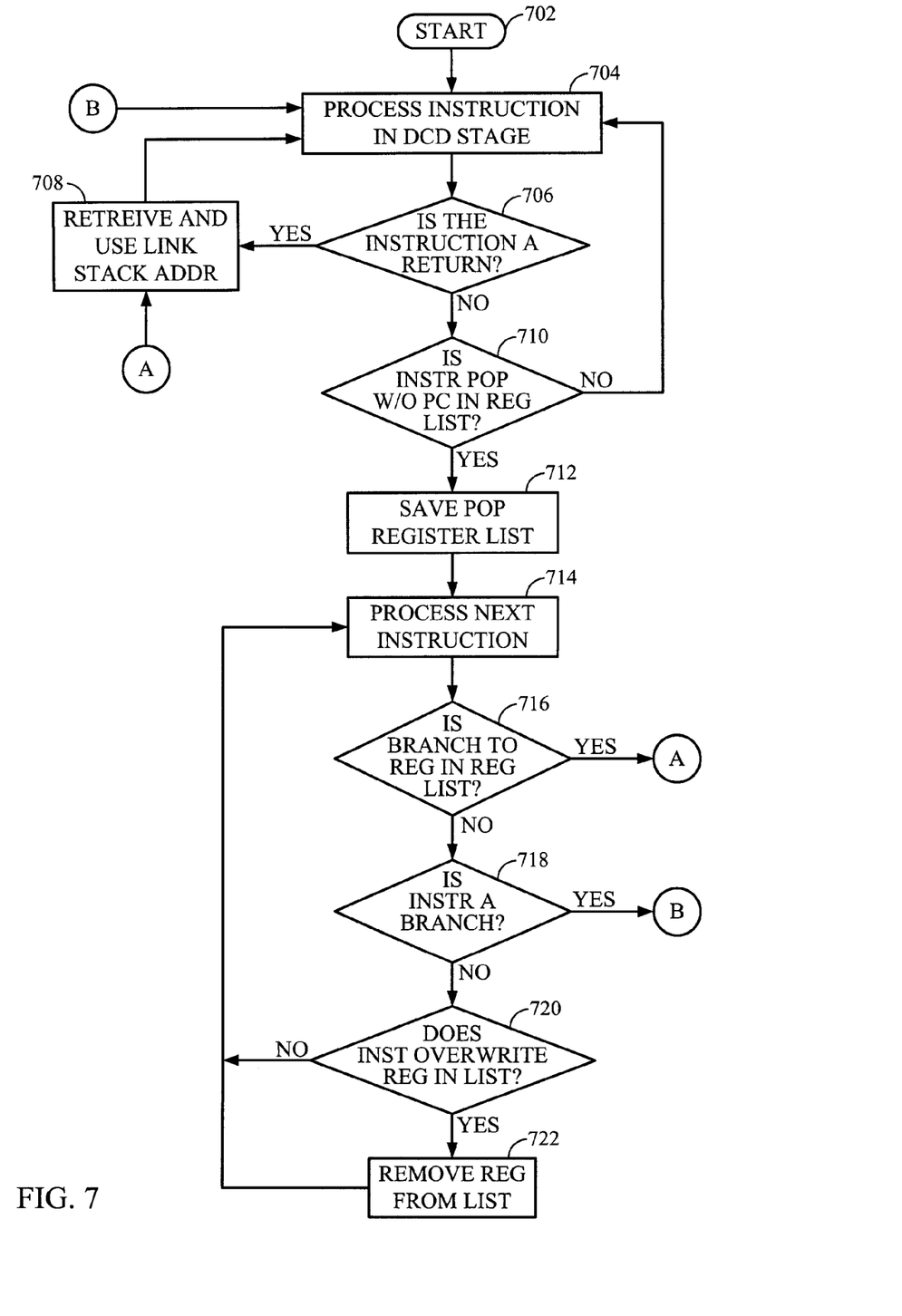
FIG. 7 shows a flow chart illustrating an alternate instruction process flow performed by the processor using the upper pipeline of FIG. 4.

FIG. 7 displays an instruction flow 700 illustrating the steps performed by the CPU 102 having the detection logic circuitry 450 in the decode logic circuitry 406 within coupled to the upper pipeline 151 of FIG. 4. For ease of illustration, the processing of instructions outlined in the instruction flow 700 assumes that the decode logic circuitry 406 processes a single instruction per processor cycle. Those skilled in the art appreciate that some processors may have decode logic circuitry capable of processing multiple instructions per processor cycle. The inventive concepts as described herein may be applied to either type of processor.

The instruction flow 700 begins at start block 702. From block 702, the instruction flow proceeds to block 704 where the instruction is processed in the decode stage 205 by the decode logic circuitry 406. From block 704, the instruction flow continues to decision block 706. At decision block 706, the detection logic circuitry 450 determines if the instruction is a procedure return. In this example, the detection logic circuitry 450 determines that the instruction is a procedure return if it is any of the previously known procedure returns other than the POP/branch sequence. If the detection logic circuitry 450 determines that the instruction is a procedure return, the instruction flow 700 continues to block 708. If the detection logic circuitry 450 determines that the instruction is not a procedure return, the instruction flow continues to decision block 710.

At decision block 710, the detection logic circuitry 450 determines if the instruction is a POP instruction not having the program counter (PC) in the register list. If the instruction is not a POP instruction without the PC in its register list, the process flow returns back to block 704. If at decision block 710 the detection logic circuitry 450 determines that the decoded instruction is a POP instruction that does not contain the PC in its register list, the instruction flow 700 continues to block 712. Since the processor 100 may be able to pop multiple registers from the software stack, at block 712 the detection logic circuitry 450 saves the popped register list. From block 712, the instruction flow 700 proceeds to block 714.

At block 714, the processor 100 loads the next instruction into the decode stage 205, and the decode logic circuitry 406 processes the instruction. After the instruction is loaded at block 714, the instruction flow 700 proceeds to decision block 716. At decision block 716, the detection logic circuitry 450 determines if the instruction is a branch to a register in the saved register list. If the detection logic circuitry 450 determines that the instruction is a branch to a register in the saved register list, the process flow continues to block 708. If the detection logic circuitry 450 determines that the instruction was not a branch instruction to a register in the saved register list, the instruction flow 700 proceeds to decision block 718.

At decision block 718, the detection logic circuitry 450 determines if the instruction is a branch instruction. If the instruction is a branch instruction, the instruction flow returns back to block 704 where the next instruction is loaded into the decode stage 205. If the instruction is not a branch instruction at decision block 718, the instruction flow 700 proceeds to decision block 720. At decision block 720, the detection logic circuitry 450 determines if the instruction overwrites a register in the saved register list.

If the instruction does not overwrite a register in the saved register list, the instruction flow 700 returns to block 714 where the next instruction is loaded into the decode stage 205 and is processed by the decode logic circuitry 406. If the instruction overwrites a register in the saved register list at decision block 720, the instruction flow 700 continues to block 722 where the overwritten register is removed from the saved register list. From block 722 the instruction flow 700 returns to block 714 where the next instruction is loaded into the decode stage 205 and is processed by the decode logic circuitry 406.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

Although specific embodiments have been illustrated and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of retrieving a return address from a link stack when returning from a procedure in a pipeline processor, the method comprising:
    identifying a retrieve instruction operable to retrieve a return address from a software stack, wherein the retrieve instruction includes a register list that identifies at least one register that indicates the return address;
    saving the register list;
    identifying a branch instruction operable to branch to the return address;
    identifying a procedure return sequence including a combination of the retrieve instruction and the branch instruction, wherein the procedure return sequence is identified by comparing the saved register list with a target register of the branch instruction;
    retrieving the return address from a link stack in response to identifying the procedure return sequence; and
    fetching an instruction using the return address.

2. The method of claim 1, wherein the retrieve instruction is a POP instruction.

3. The method of claim 1, wherein the retrieve instruction is a load instruction.

4. The method of claim 1, wherein the branch instruction is a BX instruction.

5. The method of claim 1, wherein the branch instruction is a MOV instruction.

6. The method of claim 1, wherein identifying the retrieve instruction further comprises identifying a register which contains the return address.

7. The method of claim 1, further comprising maintaining the register list, wherein maintaining the register list comprises removing a particular register from the register list when the particular register is overwritten.

8. The method of claim 1, wherein identifying the branch instruction is performed by detection logic circuitry.

9. The method of claim 8, wherein the detection logic circuitry is part of pre-decode logic circuitry.

10. The method of claim 8, wherein the detection logic circuitry is part of decode logic circuitry.

11. The method of claim 1, wherein identifying the branch instruction further comprises flagging the branch instruction in an instruction cache in response to the target register of the branch instruction matching a register of the saved register list, and further comprising identifying a second procedure return based on the flagged branch instruction without comparing the register list of the retrieve instruction to a target register of the flagged branch instruction.

12. The method of claim 1, wherein the return address is retrieved from the link stack prior to executing the retrieve instruction and the branch instruction.

13. A pipeline processor comprising:
    fetch logic circuitry having a link stack storing a plurality of predicted return addresses, the fetch logic circuitry configured to fetch instructions from an instruction cache; and
    decode logic circuitry coupled to the fetch logic circuitry, wherein the fetched instructions are decodable by the decode logic circuitry, the decode logic circuitry further comprising:
        detection logic circuitry, wherein the detection logic circuitry is operable to:
            identify a procedure return sequence including a combination of a retrieve instruction and a branch instruction, wherein the retrieve instruction is operable to retrieve an address from a software stack, wherein the retrieve instruction includes a register list that identifies at least one register that indicates at least one predicted return address, wherein the branch instruction is operable to branch to the retrieved address;
            save the register list, wherein the procedure return sequence is identified by comparing the saved register list with a target register of the branch instruction; and
            retrieve the at least one predicted return address of the plurality of predicted return addresses from the link stack in response to identifying the procedure return sequence.

14. The pipeline processor of claim 13, wherein the fetch logic circuitry fetches an instruction using the retrieved at least one predicted return address of the plurality of predicted return addresses.

15. The pipeline processor of claim 13, wherein the retrieve instruction is a POP instruction.

16. The pipeline processor of claim 13, wherein the retrieve instruction is a load instruction.

17. The pipeline processor of claim 13, wherein the branch instruction branches to an address identified by the retrieve instruction.

18. The pipeline processor of claim 13, wherein the branch instruction is a MOV instruction.

19. The pipeline processor of claim 13, wherein the detection logic circuitry is further operable to retrieve the at least one predicted return address from the link stack prior to execution of the procedure return sequence.

20. A method of retrieving a return address from a link stack in a pipeline processor, the method comprising:
    identifying a retrieve instruction operable to retrieve an address from a software stack, the retrieve instruction having a register list;
    saving the register list of the retrieve instruction;
    identifying a branch instruction;
    comparing the saved register list with a target register of the branch instruction;

determining that the target register matches a register in the saved register list;

identifying a procedure return sequence including a combination of the retrieve instruction and the branch instruction in response to determining that the target register matches the register in the saved register list;

retrieving a return address from a link stack in response to identifying the procedure return sequence; and fetching an instruction using the return address.

21. The method of claim 20, further comprising determining that the retrieve instruction does not have a program counter in the register list prior to saving the register list.

22. The method of claim 20, wherein the return address is retrieved from the link stack prior to executing the retrieve instruction and the branch instruction.

23. The method of claim 20, wherein the instruction is fetched prior to executing the retrieve instruction and the branch instruction.

24. The method of claim 20, wherein the branch instruction is an implicit branch instruction.

25. A non-transitory computer readable medium comprising executable instructions that are executable by a processor to cause the processor to:

identify a retrieve instruction operable to retrieve a return address from a software stack, wherein the retrieve instruction includes a register list that identifies at least one register that indicates the return address;

save the register list;

identify a branch instruction operable to branch to the return address;

identify a procedure return sequence including a combination of the retrieve instruction and the branch instruction, wherein the procedure return sequence is identified by comparing the saved register list with a target register of the branch instruction;

retrieve the return address from a link stack in response to identifying the procedure return sequence; and fetch an instruction using the return address.

26. The non-transitory computer readable medium of claim 25, wherein the retrieve instruction is a POP instruction.

27. The non-transitory computer readable medium of claim 25, wherein the retrieve instruction is a load instruction.

28. An apparatus comprising:

means for fetching instructions from an instruction cache, the means for fetching instructions having a link stack that stores a plurality of predicted return addresses; and means for decoding fetched instructions, wherein the means for decoding is coupled to the means for fetching, the means for decoding comprising:

means for identifying a procedure return sequence including a combination of a retrieve instruction and a branch instruction, wherein the retrieve instruction is executable to retrieve an address from a software stack, wherein the retrieve instruction includes a register list that identifies at least one register that indicates at least one predicted return address, and wherein the branch instruction is executable to branch to the retrieved address;

means for saving the register list, wherein the procedure return sequence is identified by comparing the saved register list with a target register of the branch instruction; and means for retrieving the at least one predicted return address of the plurality of predicted return addresses from the link stack in response to identifying the procedure return sequence.

29. The apparatus of claim 28, wherein the means for fetching instructions fetches an instruction using the retrieved at least one predicted return address of the plurality of predicted return addresses.

30. A non-transitory computer readable medium comprising instructions that are executable by a processor to cause the processor to:

identify a retrieve instruction operable to retrieve an address from a software stack, the retrieve instruction having a register list;

save the register list of the retrieve instruction;

identify a branch instruction;

compare the saved register list with a target register of the branch instruction;

determine that the target register matches a register in the saved register list;

identify a procedure return sequence including a combination of the retrieve instruction and the branch instruction in response to determining that the target register matches the register in the saved register list;

retrieve a return address from a link stack in response to identifying the procedure return sequence; and fetch an instruction using the return address.

31. The non-transitory computer readable medium of claim 30, wherein the return address is retrieved from the link stack prior to executing the retrieve instruction and the branch instruction.

32. The non-transitory computer readable medium of claim 30, wherein the instruction is fetched prior to executing the retrieve instruction and the branch instruction.

\* \* \* \* \*